US012126075B2

(12) United States Patent
Terashita et al.

(10) Patent No.: US 12,126,075 B2
(45) Date of Patent: Oct. 22, 2024

(54) VEHICLE ANTENNA DEVICE

(71) Applicants: YOKOWO CO., LTD., Tokyo (JP); DENSO CORPORATION, Kariya (JP)

(72) Inventors: Noritaka Terashita, Tomioka (JP); Motohisa Ono, Tomioka (JP); Toru Koike, Kariya (JP); Takuya Yamashita, Kariya (JP)

(73) Assignees: YOKOMO CO., LTD., Tokyo (JP); DENSO CORPORATION, Kariya (JP)

( * ) Notice: Subject to any disclaimer, the term of this patent is extended or adjusted under 35 U.S.C. 154(b) by 229 days.

(21) Appl. No.: 17/640,349

(22) PCT Filed: Aug. 5, 2020

(86) PCT No.: PCT/JP2020/029956

§ 371 (c)(1),
(2) Date: Mar. 4, 2022

(87) PCT Pub. No.: WO2021/044794

PCT Pub. Date: Mar. 11, 2021

(65) Prior Publication Data

US 2022/0344800 A1 Oct. 27, 2022

(30) Foreign Application Priority Data

Sep. 5, 2019 (JP) ................................. 2019-161804

(51) Int. Cl.
*H01Q 1/32* (2006.01)
*H01Q 5/40* (2015.01)
*H01Q 21/29* (2006.01)

(52) U.S. Cl.
CPC ............. *H01Q 1/3275* (2013.01); *H01Q 5/40* (2015.01); *H01Q 21/29* (2013.01)

(58) Field of Classification Search
CPC ........ H01Q 1/3275; H01Q 5/40; H01Q 21/29; H01Q 1/241; H01Q 1/3233; H01Q 1/42; H01Q 9/0407; H01Q 9/40; H01Q 21/28
See application file for complete search history.

(56) References Cited

U.S. PATENT DOCUMENTS

2005/0219131 A1* 10/2005 Haidacher ................ H01Q 1/42
343/725
2006/0174299 A1 8/2006 Watanabe et al.
(Continued)

FOREIGN PATENT DOCUMENTS

CA 2737225 A1 3/2010
JP 2006-211289 A 8/2006
(Continued)

OTHER PUBLICATIONS

International Search Report and Written Opinion mailed on Oct. 27, 2020, received for PCT Application PCT/JP2020/029956, Filed on Aug. 5, 2020, 10 pages including English Translation.

*Primary Examiner* — Hai V Tran
*Assistant Examiner* — Michael M Bouizza
(74) *Attorney, Agent, or Firm* — XSENSUS LLP

(57) ABSTRACT

A vehicle antenna device includes a plurality of antennas in an accommodating space surrounded by a case and an antenna base, and has a height of 70 mm or less from an outer surface of a vehicle when attached to the outer surface of a vehicle. The vehicle antenna device includes a first substrate on which a first patch antenna is mounted, and a second substrate on which a second patch antenna is mounted. The first substrate is provided at a position higher than the second substrate.

15 Claims, 4 Drawing Sheets

(56) References Cited

U.S. PATENT DOCUMENTS

| | | | | |
|---|---|---|---|---|
| 2010/0013724 | A1 | 1/2010 | Ohshima et al. | |
| 2017/0033450 | A1* | 2/2017 | Feng | H01Q 9/0407 |
| 2019/0027819 | A1* | 1/2019 | Terashita | H01Q 21/29 |
| 2020/0067180 | A1 | 2/2020 | Mizuno et al. | |
| 2021/0376457 | A1* | 12/2021 | Sone | H01Q 21/28 |

FOREIGN PATENT DOCUMENTS

| | | | |
|---|---|---|---|
| JP | 2009-135741 | A | 6/2009 |
| JP | 2012-503382 | A | 2/2012 |
| JP | 2018-186407 | A | 11/2018 |
| JP | 2019-80096 | A | 5/2019 |
| WO | 2019/027036 | A1 | 2/2019 |

* cited by examiner

VEHICLE ANTENNA DEVICE

CROSS-REFERENCE TO RELATED APPLICATIONS

The present application is based on PCT filing PCT/JP2020/029956, filed Aug. 5, 2020, which claims priority to JP 2019-161804, filed Sep. 5, 2019, the entire contents of each are incorporated herein by reference.

TECHNICAL FIELD

The present invention relates to a vehicle antenna device.

BACKGROUND ART

A vehicle antenna device that is attached to a roof of an automobile and that is called a shark fin antenna or a dolphin antenna has been developed, and it is also known that a plurality of antennas are mounted in one vehicle antenna device (for example, see Patent Literature 1).

CITATION LIST

Patent Literature

Patent Literature 1: JP-A-2018-186407

SUMMARY OF INVENTION

Technical Problem

The vehicle antenna device is required to have an environmental resistance performance to withstand an external environment, a shape and a size such as miniaturization and design, and the like. There is a need to develop a vehicle antenna device capable of improving inherent characteristics of an antenna while fulfilling these demands as much as possible. When a plurality of antennas are mounted in the vehicle antenna device, there is room for improvement in an arrangement configuration in the vehicle antenna device.

An example of an object of the present invention is to provide a novel technology of a vehicle antenna device that includes a plurality of antennas and that has a configuration suitable for a characteristic of each antenna in the vehicle antenna device.

Solution to Problem

An aspect of the present invention provides a vehicle antenna device that includes a plurality of antennas in an accommodating space surrounded by a case and an antenna base, and that has a height of 70 mm or less from an outer surface of a vehicle when attached to the outer surface of a vehicle, the vehicle antenna device including a first substrate on which a first patch antenna is mounted and a second substrate on which a second patch antenna is mounted, in which the first substrate is provided at a position higher than the second substrate.

According to the present aspect, one (the first patch antenna) of the two patch antennas mounted in the vehicle antenna device can be provided at a position higher than the other (the second patch antenna). For example, it is possible to implement a vehicle antenna device in which an antenna configured to receive a satellite wave of GNSS is provided at a position higher than an antenna configured to receive a predetermined digital broadcast. Accordingly, the second patch antenna provided at the low position can be suitable as an antenna that requires a high gain in a specific range of the medium elevation angle to the high elevation angle as compared with the low elevation angle, and the first patch antenna provided at the high position can be suitable as an antenna capable of obtaining a certain degree of gain in a wide elevation angle range from the low elevation angle to the high elevation angle.

DESCRIPTION OF EMBODIMENTS

Figure 1:
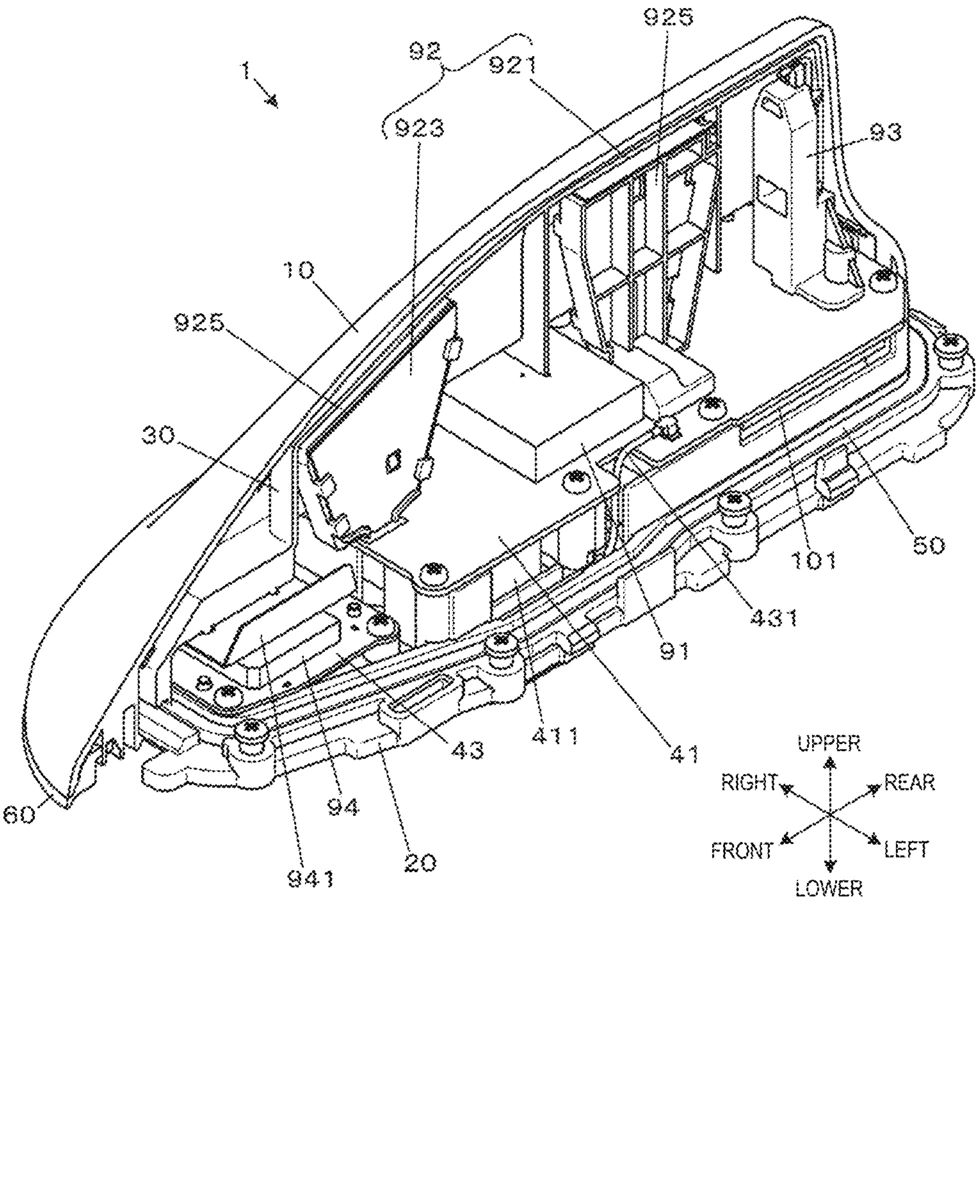
FIG. 1 is a perspective internal structural view showing a vehicle antenna, device.

A preferred embodiment of the present invention will be described with reference to the drawings. The present invention is not limited to the embodiment to be described below, and a mode to which the present invention can be applied is not limited to the following embodiment. In the description of the drawings, the same portions are denoted by the same reference numerals.

First, directions in the following description are defined as follows. A vehicle antenna device 1 according to the present embodiment is a low-height type antenna device used by being attached to an outer surface (in the present embodiment, for example, on a roof of a vehicle) of a vehicle such as a passenger car, and is an antenna device called a shark fin antenna, a dolphin antenna, or the like. As a specific numerical value of a low-height type, a height of the vehicle antenna device 1 according to the present embodiment from the outer surface of the vehicle is 70 mm or less when the vehicle antenna device 1 is attached to the outer surface of the vehicle. In the vehicle antenna device 1 according to the present embodiment, a front-rear direction of attachment to the vehicle is predetermined. A front-rear direction, a left-right direction, and an upper-lower direction of the vehicle antenna device 1 are the same as a front-rear direction, a left-right direction, and an upper-lower direction of the vehicle when the vehicle antenna device 1 is attached to the vehicle. For easy understanding of these directions of three orthogonal axes, reference directions indicating directions parallel to each of the axial directions are added to the drawings. The reference directions mean that an intersection of the reference directions does not mean a coordinate origin. An external appearance of the vehicle antenna device 1 according to the present embodiment is designed such that the front is tapered and a width of the vehicle antenna device 1 in the left-right direction gradually becomes small upward from a mounting surface of the vehicle antenna device 1 to the vehicle. Therefore, the appearance of the design can help understanding the directions.

Figure 2:
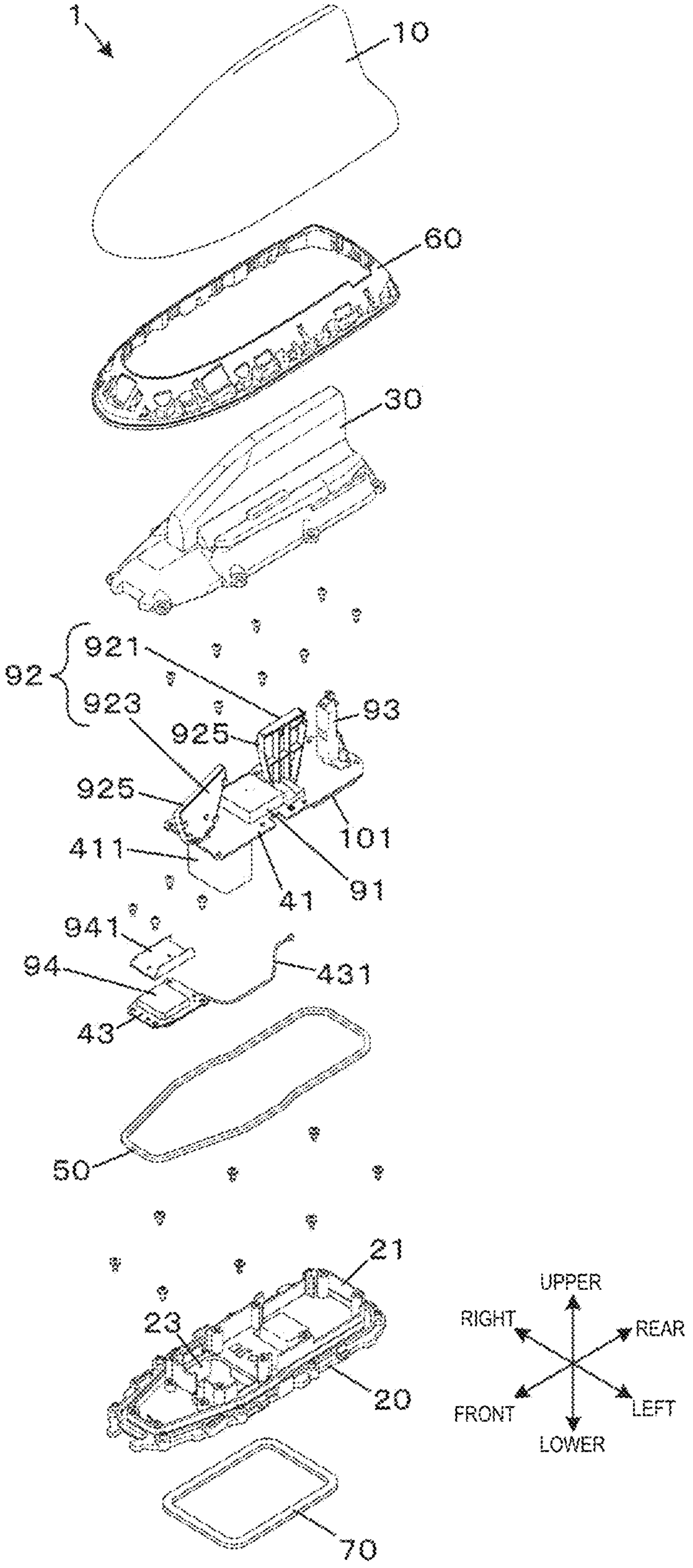
FIG. 2 is an exploded perspective view showing the vehicle antenna device.

FIG. 1 is a perspective internal structural view showing the vehicle antenna device 1 according to the present embodiment, and shows an inside of the device by cutting out front half of an outer case 10. FIG. 2 is an exploded perspective view showing the vehicle antenna device 1. FIG.

3 is a side view internal structural view showing the vehicle antenna device 1 in FIG. 1 as viewed from a left side surface, and shows the inside of the device by cutting out the front half of the outer case 10.

The vehicle antenna device 1 includes the outer case 10, an antenna base 20, an inner case 30, a first substrate 41, a second substrate 43, a waterproof ring 50, a pad 60, a seal member 70, and an attachment portion 80. A plurality of antenna elements are accommodated in an accommodating space surrounded by the antenna base 20 and the outer case 10. For example, a global navigation satellite system (GNSS) antenna 91, a TEL antenna 92, a dedicated short range communications (DSRC)/Bluetooth (registered trademark) low energy (BLE) antenna 93, and a satellite digital audio radio service (SDARS) antenna 94 are accommodated.

The outer case 10 is a case formed of synthetic resin having electromagnetic wave transparency, and forms an upper outer shell. For example, the outer case 10 has a shark fin shape that is low in the front, that has a height of 70 ram or less in a rear central portion, and, that protrudes upward. Similarly, the inner case 30 is a case formed of the synthetic resin having electromagnetic wave transparency, and forms an accommodating space by partitioning an inside of the outer case 10. Therefore, it can be said that the various antenna elements are provided in a limited accommodating space that is surrounded by the antenna base 20 and the inner case 30 and that is inside the accommodating space surrounded by the antenna base 20 and the outer case 10.

The antenna base 20 is a metal shield member, holds the first substrate 41 in a region on a rear side, and holds the second substrate 43 in a region on a front side. Specifically, the antenna base 20 includes, in a region where the first substrate 41 on the rear side is held, a wall-shaped support portion 21 along an outer edge portion of the region and a connector insertion hole 23 through which a connector portion 411 of the first substrate 41 is inserted. The second substrate 43 is fixed to the region on the front side with screws, while the first substrate 41 is placed on an upper end of the support portion 21 in the region on the rear side and is fixed with screws. Accordingly, the first substrate 41 is electrically connected to the antenna base 20, and the first substrate 41 is provided at a position higher than the second substrate 43 in a state in which the connector portion 411 is exposed below the antenna base 20.

The GNSS antenna 91 as a first patch antenna, the TEL antenna 92, and the DSRC/BLE antenna 93 are mounted on the first substrate 41. A receiving circuit part 101 is mounted on the first substrate 41 on a lower surface of the first substrate 41, and the first substrate 41 includes the connector portion 411 provided on a front side of the lower surface of the first substrate 41.

The SDARS antenna 94 as a second patch antenna is mounted on the second substrate 43. The second substrate 43 is connected to the receiving circuit part 101 provided on a lower surface of the first substrate 41 via a cable 431, and outputs a received signal of the SDARS antenna 94 to the receiving circuit part 101.

The GNSS antenna 91 is a patch antenna configured to receive a satellite wave transmitted from a positioning satellite such as a GPS satellite. In addition to GPS, Galileo, GLONASS, and the like can also be used as a positioning system. In this case, the GNSS antenna 91 receives satellite waves (a frequency band of approximately 1.1 GHz to 1.7 GHz) from these positioning satellites.

The TEL antenna 92 is a mobile communication antenna, and includes a first TEL antenna 921 which is a first antenna element and a second TEL antenna 923 which is a second antenna element. The first TEL antenna 921 and the second. TEL antenna 923 need to be spaced apart from each other by a predetermined distance in order to achieve isolation. Therefore, in the present embodiment, the first TEL antenna 921 and the second TEL antenna 923 have a configuration in which the connector portion 411 and the GNSS antenna 91 are provided between the first TEL antenna 921 and the second TEL antenna 923 and a separation distance can be secured. Further, the second TEL antenna 923, the connector portion 411, the GLASS antenna 91, and the first TEL antenna 921 are arranged in this order on the first substrate 41 from the front side.

The DSRC/BLE antenna 93 is an antenna corresponding to two communication methods which are DSRC communication and BLE communication, and is a bidirectional communication antenna.

The receiving circuit part 101 is configured to demodulate the received signal received by the SDARS antenna 94 and to output a demodulated signal as a digital signal.

The receiving circuit part 101 is provided on a lower surface side of the first substrate 41, so that the receiving circuit part 101 and any one of the antennas 91 to 93 are mounted at a position where the receiving circuit part 101 and any one of the antennas 91 to 93 partially or entirely overlap one another in a top view. Specifically, by placing the first substrate 41 on an upper portion of the wall-shaped support portion 21, a space vacant on a lower side of the first substrate 41 is used, and the receiving circuit part 101 is mounted on the lower surface side of the first substrate 41. A mounting position may be a position rearward of a feeding point of the GNSS antenna 91. In the present embodiment, the receiving circuit part 101 is provided further rearward of the first TEL antenna 921 rearward of the GNSS antenna 91 and in front of the DSRC/BLE antenna 93. Accordingly, it is possible to implement the vehicle antenna device 1 that effectively utilizes a space in the accommodating space and that incorporates the receiving circuit part 101 of the SDARS antenna 94.

The receiving circuit part 101 can generate a high frequency noise signal for the antenna. Therefore, by mounting the receiving circuit part 101 on a lower surface opposite to an upper surface of the first substrate 41 on which the antennas 91 to 93 are provided, it is possible to prevent noise from flowing into the antenna. Accordingly, the vehicle antenna device 1 having an arrangement configuration suitable for a characteristic of the antenna can be implemented.

The SDARS antenna 94 is, for example, a patch antenna configured to receive a digital broadcast using a satellite such as a 23 GHz, band SiriusXM radio, and a parasitic element 941 is provided and fixed in a manner of covering an upper portion of the SDARS antenna 94.

A type, the number, and a combination of the antenna elements provided in the vehicle antenna device 1 are not particularly limited. For example, antenna elements and the like corresponding to various wireless communication standards such as Wireless Fidelity (registered trademark) (WiFi), Long Term Evolution (registered trademark) (LTE), Vehicle to Everything (V2X), and Dedicated Short Range Communications (registered trademark) (DSRC) can be appropriately mounted.

The waterproof ring 50 is an annular elastic member formed of an elastomer, rubber, or the like. When the inner case 30 is fixed to the antenna base 20 with screws, the waterproof ring 50 is sandwiched between a lower end surface of the inner case 30 and the antenna base 20, and seals a space between the inner case 30 and the antenna base 20 in a watertight manner. Accordingly, dustproof and waterproof properties of the accommodating space are ensured.

The pad 60 is an annular elastic member formed of an elastomer, rubber, or the like, and is provided between a lower end inner peripheral edge portion of the outer case 10 and a lower end outer peripheral edge portion of the inner case 30. The pad 60 blinds a gap between the lower end peripheral edge portion of the outer case 10 and the roof (the outer surface of the vehicle) of the vehicle, and prevents water, dust, and the like from entering the pad 60.

The seal member 70 is an annular elastic member formed of an elastomer, rubber, or the like, and is provided between the antenna base 20 and the roof of the vehicle to seal a space between the antenna base 20 and the roof of the vehicle in a watertight manner.

The attachment portion 80 is used to attach the vehicle antenna device 1 to the roof of the vehicle, and is provided al a lower portion of the antenna base 20.

As described above, according to the vehicle antenna device 1 in the present embodiment, the GNSS antenna 91 can be provided at a position higher than the SDARS antenna 94. In use characteristics of the antenna, from a viewpoint of improving positioning accuracy, the GNSS antenna 91 is required to receive not only a radio wave from a satellite at a medium elevation angle to a high elevation angle but also a radio wave from a satellite at a low elevation angle. Therefore, the GNSS antenna 91 is required to obtain a certain degree of gain evenly from the low elevation angle to the high elevation angle. The SDARS antenna 94 is required to have a gain of the medium elevation angle to the high elevation angle as compared with the low elevation angle.

Figure 4:
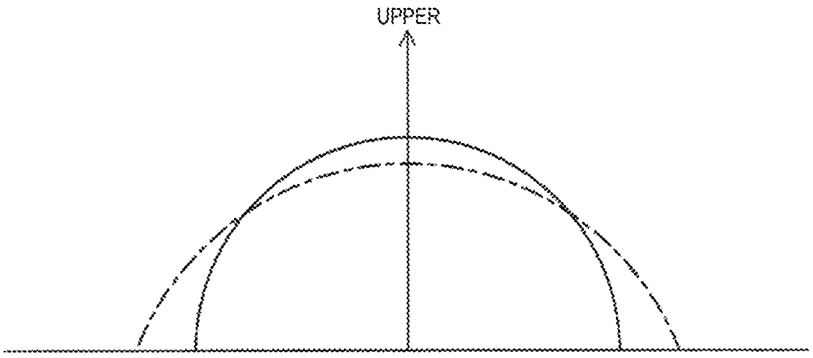
FIG. 4 is a diagram schematically showing a directivity pattern of a patch antenna.

It is found that directivity of the patch antenna changes depending on a height of an arrangement position in the accommodating space. FIG. 4 is a diagram schematically showing a difference in directivity patterns when a height of the patch antenna is changed. The directivity pattern in a case in which the height of the patch antenna is set to a low position (for example, a height of the SDARS antenna 94) is shown by a solid line, and the directivity pattern in a case in which the height of the patch antenna is set to a high position (for example, a height of the GNSS antenna 91) is shown by a dotted chain line.

As shown in FIG. 4, when the patch antenna is provided at a high position in the accommodating space, the gain at the medium elevation angle (obliquely upward) slightly decreases as compared with a case in which the patch antenna is provided at a low position. However, it is possible to improve the gain at the low elevation angle. It is considered that an electric field component is also generated between the patch antenna and the roof of the vehicle by providing the patch antenna at the high position, which has an effect of increasing the gain at the low elevation angle. Therefore, according to the vehicle antenna device 1 in the present embodiment, the SDARS antenna 94 is provided at a low position suitable as the patch antenna that requires the gain at the medium elevation angle to the high elevation angle as compared with the low elevation angle. By providing the parasitic element 941 in a manner of covering the upper portion of the SDARS antenna 94, it is possible to further improve the gain at the medium elevation angle to the high elevation angle. On the other hand, the GNSS antenna 91 having a receiving frequency lower than that of the SDARS antenna 94 is provided at a high position suitable as a patch antenna that requires a certain degree of gain evenly from the low elevation angle to the high elevation angle. Accordingly, the GNSS antenna 91 can be provided such that a range in which the gain is equal to or greater than a predetermined value is wider than that of the SDARS antenna 94, and the GNSS antenna 91 is provided in a manner of being suitable for the use characteristics of the antenna.

Figure 3:
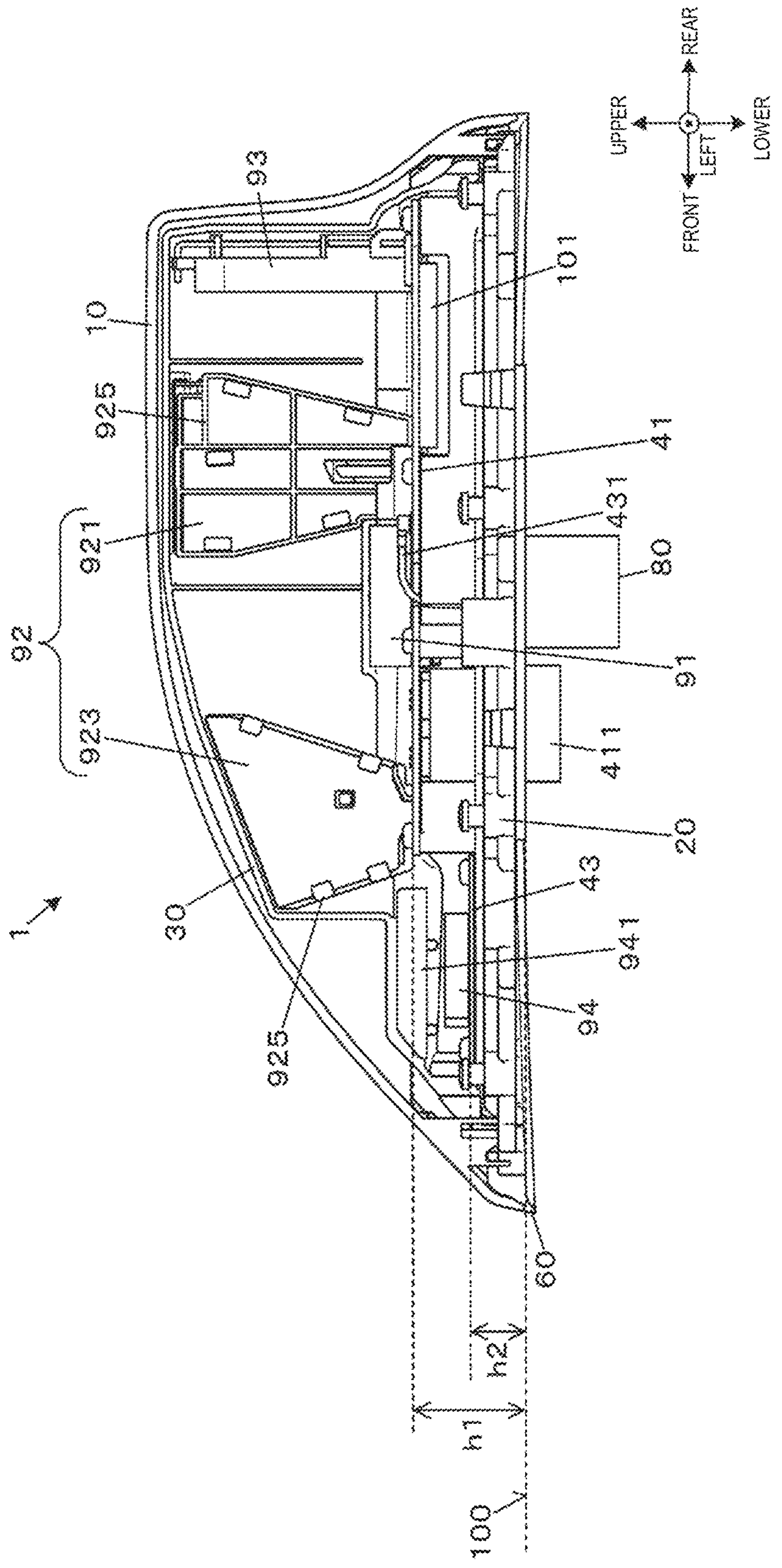
FIG. 3 is a side view internal structural view showing the vehicle antenna device.
Figure 5:
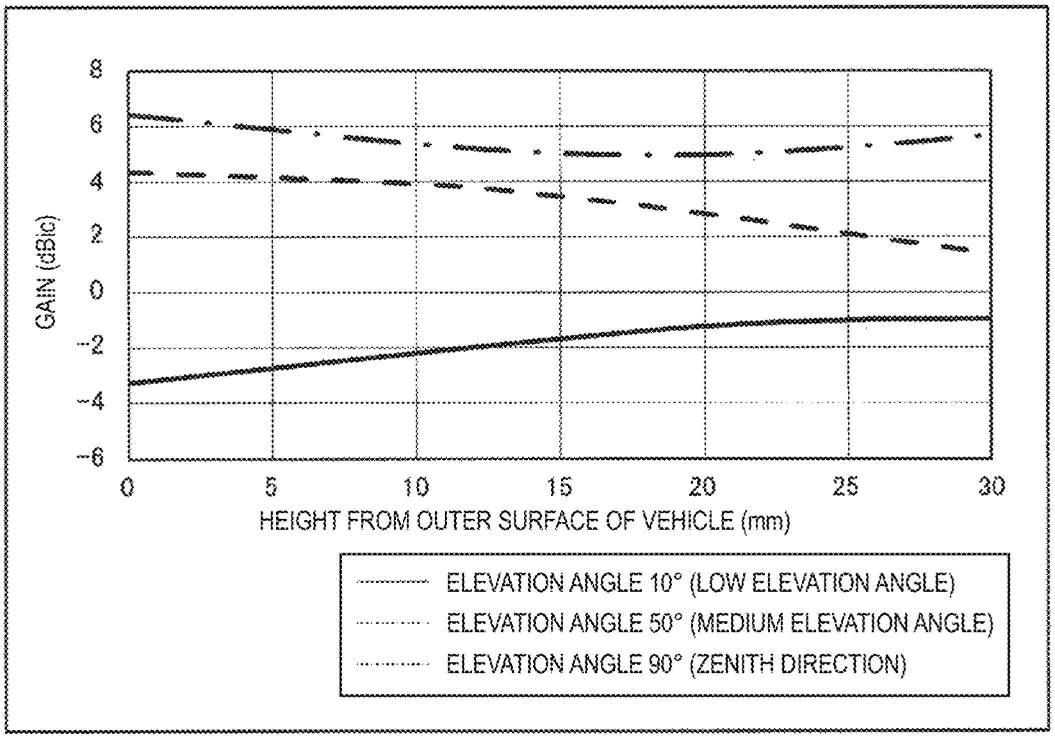
FIG. 5 is a diagram showing relation between a height from an outer surface (a roof) of a vehicle and a gain of the patch antenna.

A difference in height between the arrangement positions of the two patch antennas will be described more specifically. FIG. 5 is a diagram showing relation between a height from a position where a roof 100, which is the outer surface of the vehicle, is in contact with an upper surface of the attachment portion 80 and the gain of the patch antenna. FIG. 5 shows the gain at the low elevation angle, the gain at the medium elevation angle, and the gain in a zenith direction with different line types. As shown by a solid line graph in FIG. 5, when the height from the roof 100 is up to 25 mm, the gain at the low elevation angle tends to be improved, and when the height from the roof 100 is approximately 25 mm to 30 mm, no significant difference is generated in the gain at the low elevation angle. Therefore, as shown in FIG. 3, the upper surface of the first substrate 41 on which the GNSS antenna 91 is mounted may have a height h1 up to 25 mm from the roof 100 of the vehicle when the first substrate 41 is attached to the roof 100, and the first substrate 41 is preferably provided at a position where the height h1 is 25 mm or less. On the other hand, the gain at the high elevation angle does not change significantly as the height from the roof 100 increases. However, as for the gain at the medium elevation angle, when the height from the roof 100 exceeds 15 mm, a decrease amount with respect to a case in which the height is 0 mm exceeds 1.0 [dBic]. It can be said that the second substrate 43 on which the SDARS antenna 94 is mounted is preferably provided at a position where a height h2 of the upper surface of the second substrate 43 from the roof 100 when the second substrate 43 is attached to the roof 100 is 15 mm or less. The difference in height between the arrangement positions of the two patch antennas can be determined by, for example, setting a height of the support portion 21.

The vehicle antenna device called a shark fin antenna, a dolphin antenna, or the like has restrictions on a shape and a size of the accommodating space of the antenna from a viewpoint of miniaturization, design, and the like. In the present embodiment, the second substrate 43 having a low height position is provided in the region on the front side to provide the SDARS antenna 94, and the first substrate 41 having a high height position is provided in the region on the rear side to provide the GNSS antenna 91. Accordingly, it is possible to implement the antenna arrangement that effectively utilizes the space of the accommodating space of the antenna in which a height space in front is narrow.

In the present embodiment, in addition to the GNSS antenna 91, the TEL antenna 92 (the first TCL antenna 921 and the second TEL antenna 923) and the DSRC/BLE antenna 93 are mounted on the first substrate 41. Accordingly, from a viewpoint of reducing a influence of transmission loss and reducing noise, the antenna for which a length of a transmission path is desired to be reduced can be mounted on the same substrate.

In the present embodiment, the receiving circuit part 101 of the SDARS antenna 94 is built in the vehicle antenna device 1. If types of the antennas to be mounted are increased, the number of coaxial cables that transmit the received signal is accordingly increased, and a wiring space is also required. Further, as a frequency and a bandwidth of the antenna to be mounted increase, it is necessary to select a cable with a large wire diameter and low transmission loss.

In the present embodiment, by setting the arrangement height of the first substrate 41 to be high, a cable having a large wire diameter can be wired, a structure is formed to cope with an increase in the number of coaxial cables, and the space can be effectively utilized. Since the data related to the received signal of the SDARS antenna 94 can be converted into a digital signal and exchanged with a vehicle side unit, the number of the coaxial cables can be reduced.

In the present embodiment, the connector portion 411 and the GNSS antenna 91 are provided between the first TEL antenna 921 and the second TEL antenna 923. Accordingly, it is possible to effectively utilize the space while ensuring mutual isolation between the first TEL antenna 921 and the second TEL antenna 923.

A hole serving as a ventilation hole for dissipating heat generated by a LNA (Low Noise Amplifier) mounted on the first substrate 41 and the receiving circuit part 101 may be formed rearward of the connector insertion hole 23 of the antenna base 20. For example, a ventilation hole may be formed in a rear portion of the antenna base 20 at a position facing the receiving circuit part 101. The ventilation hole may be one or several holes (openings), or may be a plurality of small holes formed in a mesh shape.

The disclosed content of the present specification can be summarized as follows.

An aspect of the present disclosure provides a vehicle antenna device that includes a plurality of antennas in an accommodating space surrounded by a case and an antenna base, and that has a height of 70 mm or less from an outer surface of a vehicle when attached to the outer surface of a vehicle, the vehicle antenna device including a first substrate on which a first patch antenna is mounted and a second substrate on which a second patch antenna is mounted, in which the first substrate is provided at a position higher than the second substrate.

The first patch antenna may have a lower receiving frequency than the second patch antenna.

The first patch antenna may be an antenna configured to receive a satellite wave of a global navigation satellite system (GNSS).

The second patch antenna may be an antenna configured to receive a predetermined digital broadcast.

According to the present aspect, one (the first patch antenna) of the two patch antennas to be mounted can be provided at a position higher than the other (the second patch antenna). For example, it is possible to implement a vehicle antenna device in which an antenna configured to receive a satellite wave of GNSS is provided at a position higher than an antenna configured to receive a predetermined digital broadcast. Accordingly, the second patch antenna provided at the low position can be suitable as an antenna that requires a high gain in a specific range of the medium elevation angle to the high elevation angle as compared with the low elevation angle, and the first patch antenna provided at the high position can be suitable as an antenna capable of obtaining a certain degree of gain in a wide elevation angle range from the low elevation angle to the high elevation angle.

In the vehicle antenna device, a front-rear direction of attachment to the vehicle may be determined, and the second substrate may be provided in front of the first substrate.

The first substrate may be provided at a position where an upper surface of the first substrate is higher than an upper surface of the second patch antenna.

The first substrate may be provided at a position where a height of an upper surface of the first substrate from the outer surface of the vehicle when the first substrate is attached to the outer surface of the vehicle is 25 mm or less, and the second substrate may be provided at a position where a height of an upper surface of the second substrate from the outer surface of the vehicle when the second substrate is attached to the outer surface of the vehicle is 15 mm or less.

A receiving circuit part configured to demodulate a received signal received by the second patch antenna and to output a demodulated signal as a digital signal is mounted on the first substrate.

In the vehicle antenna device, a front-rear direction of attachment to the vehicle may be determined, and a mounting position of the receiving circuit part on the first substrate may be rearward of a feeding point of the first patch antenna.

A mobile communication antenna including a first antenna element and a second antenna element may be mounted on the first substrate, and the first patch antenna may be mounted between the first antenna element and the second antenna element.

The outer surface of the vehicle may be a roof of the vehicle.

REFERENCE SIGNS LIST

1 vehicle antenna device
10 outer case
20 antenna base
21 support portion
23 connector insertion hole
30 inner case
41 first substrate
411 connector portion
43 second substrate
50 waterproof ring
60 pad.
70 seal member
80 attachment portion
91 GLASS antenna
92 TEL antenna
921 first TEL antenna
923 second TEL antenna
93 DSRC/BLE antenna
94 SDARS antenna
941 parasitic element
101 receiving circuit part

The invention claimed is:

1. A vehicle antenna device that includes a plurality of antennas in an accommodating space surrounded by a case and an antenna base, and that has a height of 70 mm or less from an outer surface of a vehicle when attached to the outer surface of a vehicle, the vehicle antenna device comprising:

a first substrate on which a first patch antenna is mounted; and a second substrate on which a second patch antenna is mounted, wherein the first substrate is provided at a position higher than the second substrate, wherein a receiving circuit part configured to demodulate a received signal received by the second patch antenna and to output a demodulated signal as a digital signal is mounted on the first substrate.

2. The vehicle antenna device according to claim 1, wherein a receiving frequency of the first patch antenna lower than a receiving frequency of the second patch antenna.

3. The vehicle antenna device according to claim 2, wherein the first patch antenna is an antenna configured to receive a satellite wave of a GNSS (Global Navigation Satellite System).

4. The vehicle antenna device according to claim 1, wherein the first patch antenna is an antenna configured to receive a satellite wave of a GNSS (Global Navigation Satellite System).

5. The vehicle antenna device according to claim 4, wherein the second patch antenna is an antenna configured to receive a predetermined digital broadcast.

6. The vehicle antenna device according to claim 1, wherein the second patch antenna is an antenna configured to receive a predetermined digital broadcast.

7. The vehicle antenna device according to claim 6, wherein a front-rear direction of attachment to the vehicle is predetermined, and wherein the second substrate is provided in front of the first substrate.

8. The vehicle antenna device according to claim 1, wherein a front-rear direction of attachment to the vehicle is predetermined, and wherein the second substrate is provided in front of the first substrate.

9. The vehicle antenna device according to claim 8, wherein the first substrate is provided at a position where an upper surface of the first substrate is higher than an upper surface of the second patch antenna.

10. The vehicle antenna device according to claim 1, wherein the first substrate is provided at a position where an upper surface of the first substrate is higher than an upper surface of the second patch antenna.

11. The vehicle antenna device according to claim 10, wherein when the vehicle antenna device is attached to the outer surface of the vehicle, the first substrate is provided at a position where a height of an upper surface of the first substrate from the outer surface of the vehicle is 25 mm or less, and wherein when the vehicle antenna device is attached to the outer surface of the vehicle, the second substrate is provided at a position where a height of an upper surface of the second substrate from the outer surface of the vehicle is 15 mm or less.

12. The vehicle antenna device according to claim 1, wherein when the vehicle antenna device is attached to the outer surface of the vehicle, the first substrate is provided at a position where a height of an upper surface of the first substrate from the outer surface of the vehicle is 25 mm or less, and wherein when the vehicle antenna device is attached to the outer surface of the vehicle, the second substrate is provided at a position where a height of an upper surface of the second substrate from the outer surface of the vehicle is 15 mm or less.

13. The vehicle antenna device according to claim 1, wherein a front-rear direction of attachment to the vehicle is predetermined, and wherein a mounting position of the receiving circuit part on the first substrate is at a rear side than a feeding point of the first patch antenna.

14. The vehicle antenna device according to claim 1, wherein a mobile communication antenna including a first antenna element and a second antenna element is mounted on the first substrate, and wherein the first patch antenna is mounted between the first antenna element and the second antenna element.

15. The vehicle antenna device according to claim 1, wherein the outer surface of the vehicle is a roof of the vehicle.

* * * * *